Aug. 29, 1950 — L. KERESZTES — 2,520,505
SHUTTER OPERATING ATTACHMENT FOR CAMERAS
Filed Sept. 24, 1947 — 2 Sheets-Sheet 1

INVENTOR
LADISLAV KERESZTES
BY Henry L. Burkitt
ATTORNEY

Aug. 29, 1950 — L. KERESZTES — 2,520,505

SHUTTER OPERATING ATTACHMENT FOR CAMERAS

Filed Sept. 24, 1947

INVENTOR
LADISLAV KERESZTES

BY Henry L. Burkitt

ATTORNEY

Patented Aug. 29, 1950

2,520,505

UNITED STATES PATENT OFFICE 2,520,505

SHUTTER OPERATING ATTACHMENT FOR CAMERAS

Ladislav Keresztes, New York, N. Y.

Application September 24, 1947, Serial No. 775,914

1 Claim. (Cl. 95—53)

This invention relates to A Shutter Operating Attachment for Cameras.

In certain well-known types of cameras, the user grasps the camera in his hands, and sights by looking with one eye through an opening at the rear side of the camera. This opening is one end of an optical system which has a window in the front face of the camera, opening in the same direction as the main lens system. The main lens system, positioned to extend forwardly at the front of the camera, is mounted in a support which can be adjusted by turning a ring gear by means of a small pinion in order to bring the main lens system into proper focus. The pinion is manipulated by direct engagement therewith of a finger of one of the hands of the operator which, of course, must extend across the front of the camera for that purpose. Immediately adjacent the pinion is a shutter-operating trigger. A finger of the operator's hand which is engaged in focussing by manipulating the pinion is extended to operate this trigger. This extended finger, from the very association of the parts of the camera, necessarily must extend in front of the window mentioned above, and thus obstruct continuous vision of the object upon which the operator is attempting to focus the camera.

It is an object of this invention to provide a means for operating such a trigger in such manner that such operation is efficiently and simply effected without obstruction of the view during any part of the focussing operation, and, particularly, as the shutter is to be manipulated.

A further object is to provide a simple, efficient, durable and economical trigger-operating device which can be applied, as a unit, to a camera of standard construction, without alteration of the construction or disposition of the parts of the camera.

Other objects of the invention will be set forth hereinafter, or will be apparent from the description and the drawings, in which is illustrated an embodiment exemplifying the invention.

The invention, however, is not intended to be restricted to any particular construction, or any particular arrangement of parts, or any particular application of any such construction or arrangement of parts, or any specific method of use, or any of the various details thereof, even where specifically shown and described herein, as the same may be modified in various particulars, or may be applied in many varied relations, without departing from the spirit and scope of the claimed invention, of which the exemplifying embodiment, herein shown and described, is intended only to be illustrative, and only for the purpose of complying with the requirements of the statutes for disclosure of an operative embodiment, but not to show all of the various forms and modifications in which the invention might be embodied.

On the drawings, in which the same reference characters refer to the same parts throughout, and in which is disclosed such a practical construction, Fig. 1 is a front elevation of a camera of the type mentioned, having means embodying the invention associated therewith, the parts being shown in their normal positions, and the fingers of the hands being shown in operating positions;

Figure 1:
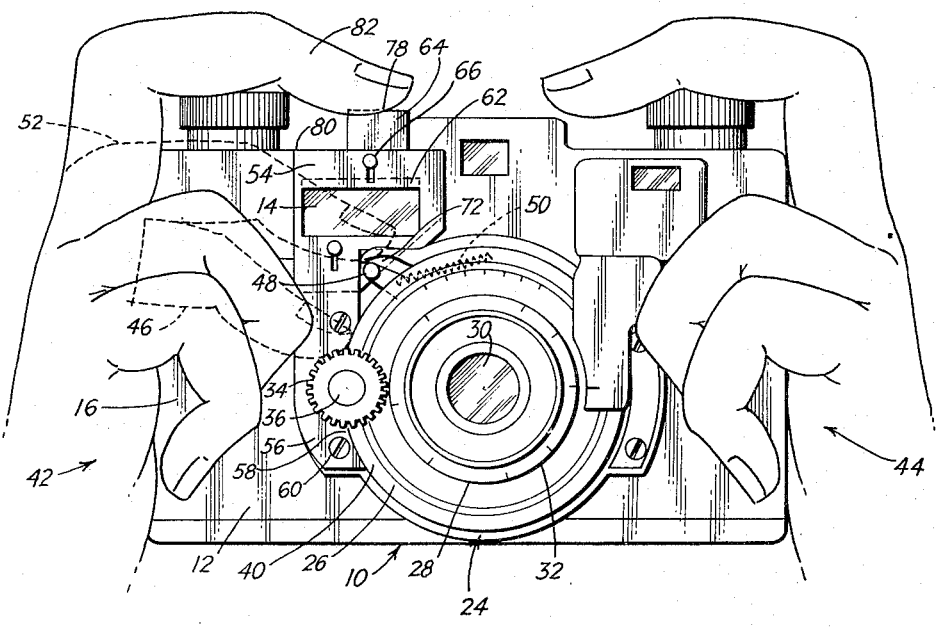
Figures 2, 3:
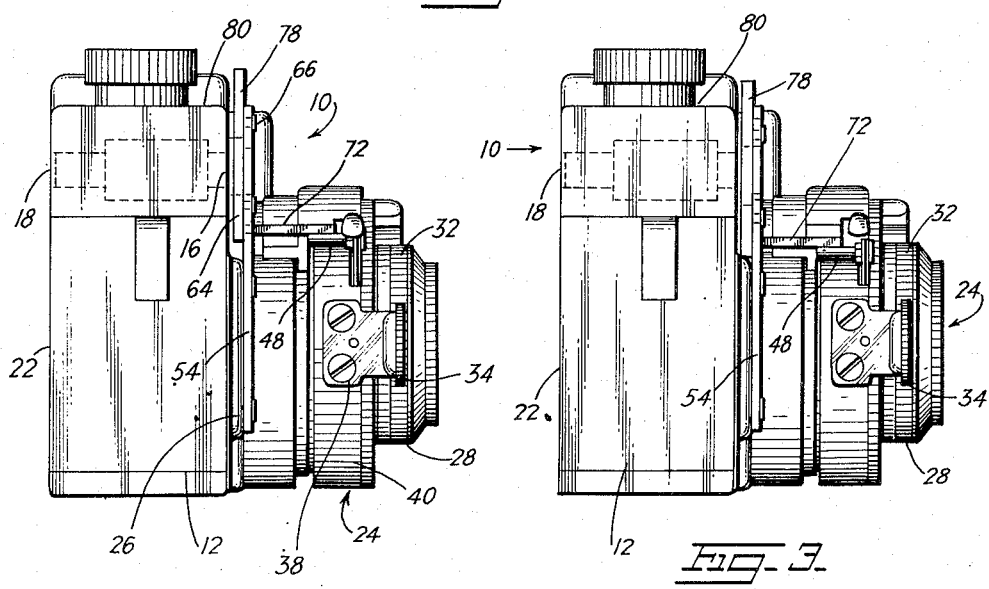
Fig. 2 is a side view of the assembly shown in Fig. 1.
Fig. 3 is a view similar to Fig. 2, the parts of the shutter-operating mechanism, however, having been depressed to operated position.
Figures 4, 5:
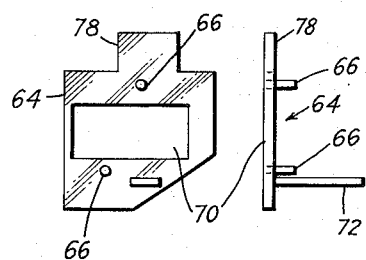
Fig. 4 is a front elevation of a movable part of the trigger-operating mechanism.
Fig. 5 is a side elevation of the part shown in Fig. 4.
Figures 6, 7:
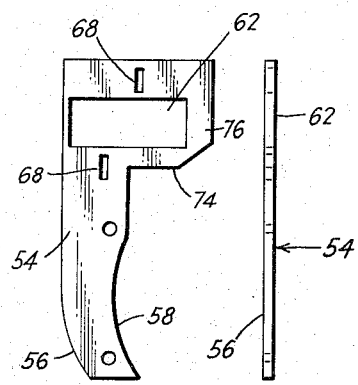
Fig. 6 is a front elevation of a stationary part for the trigger-operating mechanism.
Fig. 7 is a side elevation of the part shown in Fig. 5.
Figures 8, 9:
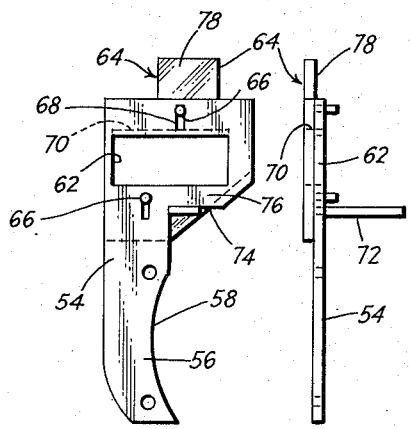
Fig. 8 is a front elevation of the trigger-operating mechanism, embodying features of the invention, but separated from the camera, yet operatively associated in the normal position.
Fig. 9 is a side elevation of the mechanism shown in Fig. 8.
Figures 10, 11:
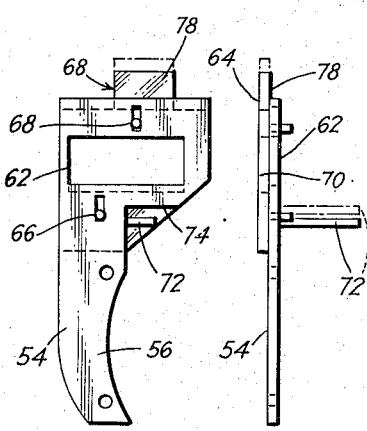
Fig. 10 is a view similar to Fig. 8, the mechanism, however, having been brought into the operated position.
Fig. 11 is a side elevation of the mechanism in the position of Fig. 10.

Referring to the specific form of the invention shown on the drawings, there is shown a camera 10 including a body 12, within which are disposed a pair of optical systems. Details of the construction of those optical systems within body 12 need not be disclosed herein; they form no part of the invention herein except as the invention relates to the external manipulation phases thereof, and the use of elements such as front view window 14 in which the so-called "finder" system terminates at the front face 16 of body 12. The other end of that same system is a sighting opening 18 at the rear face 22 of body 12 to which the operator addresses his eyes as he attempts to focus the camera.

Extending forwardly from and secured in the manner of such cameras in relation to face 16 is the lens assembly 24 of the other optical system. Lens assembly 24 may be secured to face 16 by means of a base plate 26; the assembly may include a lens mounting 28 retaining a lens 30, all of which may be associated in the usual manner, and includes a peripheral ring gear 32 on mounting 28. Mounting 28 can be turned to focus the lens by engagement therewith directly of the fingers of the operator; for a more accurate and facile adjustment which does not project the fingers of the operator across the opening at which lens 30 is effective, a small roller gear 34 engages gear 32. Gear 34, as shown, is rotatably mounted on the end of pin 36 which in turn is fixed in a bracket 38 fixed to body 40 of assembly 24 upon which mounting 28 is rotatably retained. Gear 34, being much smaller than gear 32, provides what amounts to a vernier adjustment for the setting of mounting 28 in focussing lens 30. Further, gear 34 is positioned so that, as the hands 42 and 44 of the operator grasp body 12, in attempting to set mounting 28 in "finding the range," it may be engaged by the finger 46 of the operator extended forwardly from hand 42.

In cameras of this type, the shutter of the camera (which need not be shown, as its details form no specific part of this invention except as they are operated by the mechanism here described) is operated by moving a shutter trigger 48 by pushing it downwardly from the position shown in Fig. 1. The trigger is of the usual construction and is capable of operation in the usual manner. The trigger is under the driving action of a return spring 50 housed within body 40, and merely shown diagrammatically in Fig. 1. In the operation of the trigger, in the type of camera here described, a finger 52 is extended from the same hand 42, after the lens has been focussed properly, to engage the trigger. The trigger lies above roller gear 34, and in such position that finger 52, in order to engage the trigger, must assume a position directly in front of window 14. Thus, continued uninterrupted observation of the object being photographed is prevented at the most critical moment, when the shutter is being opened and the exposure made. To overcome this defect, the operating system here to be described has been provided.

This operating system, in one of its specific phases, comprises a plate-like member 54 of substantially uniform thickness throughout. The member has a lower arm 56 having a curved edge 58 to interfit with body 40. Arm 56 is provided with screw holes to fit against base plate 26. The screws 60 provided for holding base plate 26 in position may be utilized for the purpose of holding arm 56, and thereby the entire operating assembly, in place. At its upper portion, member 54 is enlarged, and has an opening 62 provided therein at least as large in outline as window 14. Held against the back of the upper portion of member 54, but slidable with relation thereto, is a slide plate 64. By means of pins 66, secured to plate 64 and positioned to project through slots 68 in member 54, plate 64 is permitted limited movement with relation to member 54. Plate 64 has an opening 70 considerably larger than window 14 and opening 62. The limits set by pins 66 and slots 68, together with the dimensioning of openings 62 and 70 with relation to window 14, are such that, no matter what the position of plate 64 with relation to member 54, no part of plate 64 will enter the line of vision through window 14 and opening 62.

From plate 64, a finger 72 projects forwardly. The finger is secured to or made a part of plate 64 in any desired manner. In the structure shown, the finger has an end inserted in an opening in plate 64 and there swedged or peined over to hold the finger in position.

The finger is located so that, when pins 66 are at their upper limit of travel, the finger will be either in abutment or substantially in abutment with lower edge 74 of the projection 76 formed by the enlargement of member 54. The length of the finger is sufficient to bring it forwardly over and, on downward movement, to abut against trigger 48. The length of finger 72 is such that, as mounting 28 is moved during focussing, finger 72 always remains in position to contact the trigger.

Plate 64, at its top, has a lip 78 which normally projects upwardly from the plate and above the level of the top face 80 of camera body 12. There it can be reached by a finger 82 of hand 42 of the operator, to be depressed at will. Plate 64 is held in its uppermost position by the action of spring 50 heretofore described.

The parts, thus described, normally assume the positions shown in Figs. 1, 2, 8 and 9, under the pressure of spring 50 delivered through trigger 48. When the operator wishes to take a picture, he manipulates roller 34 to focus the lens while sighting at the object, holding the camera up to his eyes, through the optical system, which includes window 14. When he has completed his focussing, and wishes to operate the shutter to make the necessary exposure, he merely presses down on the top of lip 78 with his finger 82, depressing plate 64. Finger 72 thereby depresses trigger 48 to operate it and the shutter. In doing this, finger 82 is always located to the rear of front face 16, and, therefore, never interferes with vision through window 14. Also, plate 64, in its movement, likewise does not cut off the view at any time.

Thus, there is provided a manipulable element, capable of being attached to the body of the camera by a simple operation, and movable by the finger of the operator without obstructing the view, to manipulate the shutter trigger in all positions of the lens. More particularly, the device is capable of assembly as a unit with a standard camera by means of securing means already a part of the camera, and without in any way altering the usual construction or operation of the camera, or requiring extensive or expensive changes therein.

Many other changes could be effected in the particular construction, and in the methods of use and construction, and in specific details thereof, hereinbefore set forth, without substantially departing from the invention defined in the claim, the specific description being merely of an embodiment capable of illustrating certain principles of the invention.

What I claim as my invention, is:

Means for actuating the shutter of a camera, wherein the camera has a focusable optical system, means for adjusting the optical system to focus the camera, a range finding optical system for finding the range for the proper focussing of the camera, the range-finding system including an opening in the front face of the camera, and a shutter trigger disposed immediately adjacent the line of sight from said opening, the actuating means including a plate fixed at the front of the camera and having an opening at least as large as the range-finding opening, the plate being positioned so that the line of sight to the range-finding opening is through the plate opening, a slide plate retained in slidable relation to said fixed plate, the slide plate having an opening larger than the other openings and positioned so that the line of sight to the range-finding opening is unobstructed by the slide plate opening in any position to which the slide plate may be moved, said slide plate having a forwardly extending finger to abut against and actuate said trigger, said slide plate having a lip extending to a position above the top of the upper face of the camera and capable of being depressed by the hand of the operator, whereby the trigger may be operated from the top of the camera without obstructing the view through the range-finding opening while an exposure is being made.

LADISLAV KERESZTES.

REFERENCES CITED

The following references are of record in the file of this patent:

UNITED STATES PATENTS

| Number | Name | Date |
| --- | --- | --- |
| 1,273,172 | Marks | July 23, 1918 |
| 1,457,563 | Underwood | Jan. 5, 1923 |
| 2,204,488 | Goldhammer | June 11, 1940 |
| 2,213,749 | Strauss | Sept. 3, 1940 |
| 2,317,465 | Kende et al. | Apr. 27, 1943 |
| 2,353,893 | Hineline | July 18, 1944 |
| 2,358,121 | Wittel | Sept. 12, 1944 |
| 2,464,790 | Bolsey | Mar. 22, 1949 |

FOREIGN PATENTS

| Number | Country | Date |
| --- | --- | --- |
| 629,567 | Germany | May 6, 1936 |
| 687,744 | Germany | Feb. 5, 1940 |